US008929539B2

(12) United States Patent
Wolrich et al.

(10) Patent No.: US 8,929,539 B2
(45) Date of Patent: Jan. 6, 2015

(54) INSTRUCTIONS TO PERFORM GROESTL HASHING

(75) Inventors: Gilbert M. Wolrich, Framingham, MA (US); Kirk S. Yap, Framingham, MA (US); Vinodh Gopal, Westborough, MA (US); James D. Guilford, Northborough, MA (US); Erdinc Ozturk, Marlborough, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 13/992,461

(22) PCT Filed: Dec. 22, 2011

(86) PCT No.: PCT/US2011/066775
§ 371 (c)(1),
(2), (4) Date: Jun. 7, 2013

(87) PCT Pub. No.: WO2013/095493
PCT Pub. Date: Jun. 27, 2013

(65) Prior Publication Data
US 2014/0016774 A1 Jan. 16, 2014

(51) Int. Cl.
*H04K 1/00* (2006.01)
*H04L 9/28* (2006.01)
*G06F 13/14* (2006.01)
*G06F 9/30* (2006.01)
*H04L 9/06* (2006.01)

(52) U.S. Cl.
CPC ........ *H04L 9/28* (2013.01); *G06F 13/14* (2013.01); *G06F 9/30018* (2013.01); *G06F 9/30036* (2013.01); *G06F 9/30109* (2013.01); *H04L 9/0643* (2013.01)
USPC .............................................. 380/28

(58) Field of Classification Search
CPC . G06F 13/14; G06F 9/30018; G06F 9/30036; G06F 9/30109; H04L 9/0643; H04L 9/28
USPC ................................................ 380/28; 712/221
See application file for complete search history.

(56) References Cited

U.S. PATENT DOCUMENTS

| 7,039,854 | B1 * | 5/2006 | Ireland et al. ............... 714/785 |
| 7,177,891 | B2 * | 2/2007 | Stein et al. .................. 708/492 |
| 7,952,587 | B2 * | 5/2011 | Hansen et al. ............... 345/522 |
| 8,086,864 | B2 | 12/2011 | Kim et al. |
| 2004/0078409 | A1 * | 4/2004 | Stein et al. ................. 708/492 |
| 2004/0202317 | A1 | 10/2004 | Demjanenko et al. |
| 2005/0283714 | A1 | 12/2005 | Korkishko et al. |
| 2014/0006753 | A1 * | 1/2014 | Gopal et al. ................. 712/221 |

OTHER PUBLICATIONS

PCT International Search Report for PCT Counterpart Application No. PCT/US2011/066775, 3 pgs., (Jul. 19, 2012).

(Continued)

*Primary Examiner* — Samson Lemma
(74) *Attorney, Agent, or Firm* — Blakely, Sokoloff, Taylor & Zafman LLP

(57) ABSTRACT

A method is described. The method includes executing an instruction to perform one or more Galois Field (GF) multiply by 2 operations on a state matrix and executing an instruction to combine results of the one or more GF multiply by 2 operations with exclusive or (XOR) functions to generate a result matrix.

28 Claims, 14 Drawing Sheets

(56) References Cited

OTHER PUBLICATIONS

PCT Written Opinion of the International Searching Authority for PCT Counterpart Application No. PCT/US2011/066775, 5 pgs., (Jul. 19, 2012).

PCT Notification concerning Transmittal of International Preliminary Report on Patentability (Chapter I of the Patent Cooperation Treaty) for PCT Counterpart Application No. PCT/US2011/066775, 7 pgs., (Jul. 3, 2014).

Järvinen, K., "Sharing Resources between AES and the SHA-3 Second Round Candidates Fugue and Grøstl", The Second SHA-3 Candidate Conference, 2010, pp. 2, 7-8.

Aoki, K., et al., "Byte Slicing Grøstl, Optimized Intel AES-NI and 8-bit Implementations of the SHA-3 Finalist Grøstl 1", NTT Corporation, Japan & Graz University of Technology, Austria, SECRYPT 2011—Proceedings of the International Conference on Security and Cryptography, Seville, Spain, Jul. 18-21, 2011.

Gauravaram, P., et al. "Grøstl—a SHA-3 candidate", http://www.groestl.info, Department of Mathematics, Technical University of Denmark, Mar. 2, 2011, Demark, et al., Poland, Austria and Belgium.

Intel Corporation, "Intel 64 and IA-32 Architectures, Software Developer's Manual, Instruction Set Reference, A-Z", Jun. 2014, 1493 pgs., vol. 2 (2A, 2B & 2C).

* cited by examiner

INSTRUCTIONS TO PERFORM GROESTL HASHING

CROSS-REFERENCE TO RELATED APPLICATION

This patent application is a U.S. National Phase Application under 35 U.S.C. §371 of International Application No. PCT/US2011/066775, filed Dec. 22, 2011, entitled INSTRUCTIONS TO PERFORM GROESTL HASHING.

FIELD OF THE INVENTION

This disclosure relates to cryptographic algorithms and in particular to the Groestl Secure Hashing algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information. The Groestl algorithm is an AES-based iterated hash function with a compression function built from two fixed, large, distinct permutations (P and Q).

The compression function (f) is defined via permutations of P and Q such that: $f(h,m)=P(h \text{ XOR } m) \text{ XOR } Q(m) \text{ XOR } h$, where functions P and Q are permutation functions and $h_{i-1}$ is an input state, $m_i$ is a message block input, and $h_i$ is a result state. Encryption (cipher) performs a series of transformations using the secret key (cipher key) to transform intelligible data referred to as "plaintext" into an unintelligible form referred to as "cipher text". The transformations in the cipher include: (1) Adding a round constant (values derived from the P function and the Q function) to the state (a two dimensional array of bytes) using a Exclusive OR (XOR) operation; (2) Processing the state using a non-linear byte substitution table (S-Box); (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Groestl algorithm transforms the plaintext into cipher text or cipher text into plaintext in 10 or 14 consecutive rounds, with the number of rounds dependent on the length of the key.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A mechanism including instructions to process the Groestl Secure Hashing algorithm is described. As discussed above, the Groestl algorithm is a cryptographic hash function that is based on the Rijindael algorithm specified in the AES standard. The AES standard includes an to instruction set (e.g., the AES instruction set) that provides an instruction set extension for performing AES encryption and decryption in a general purpose processor.

Figure 1:
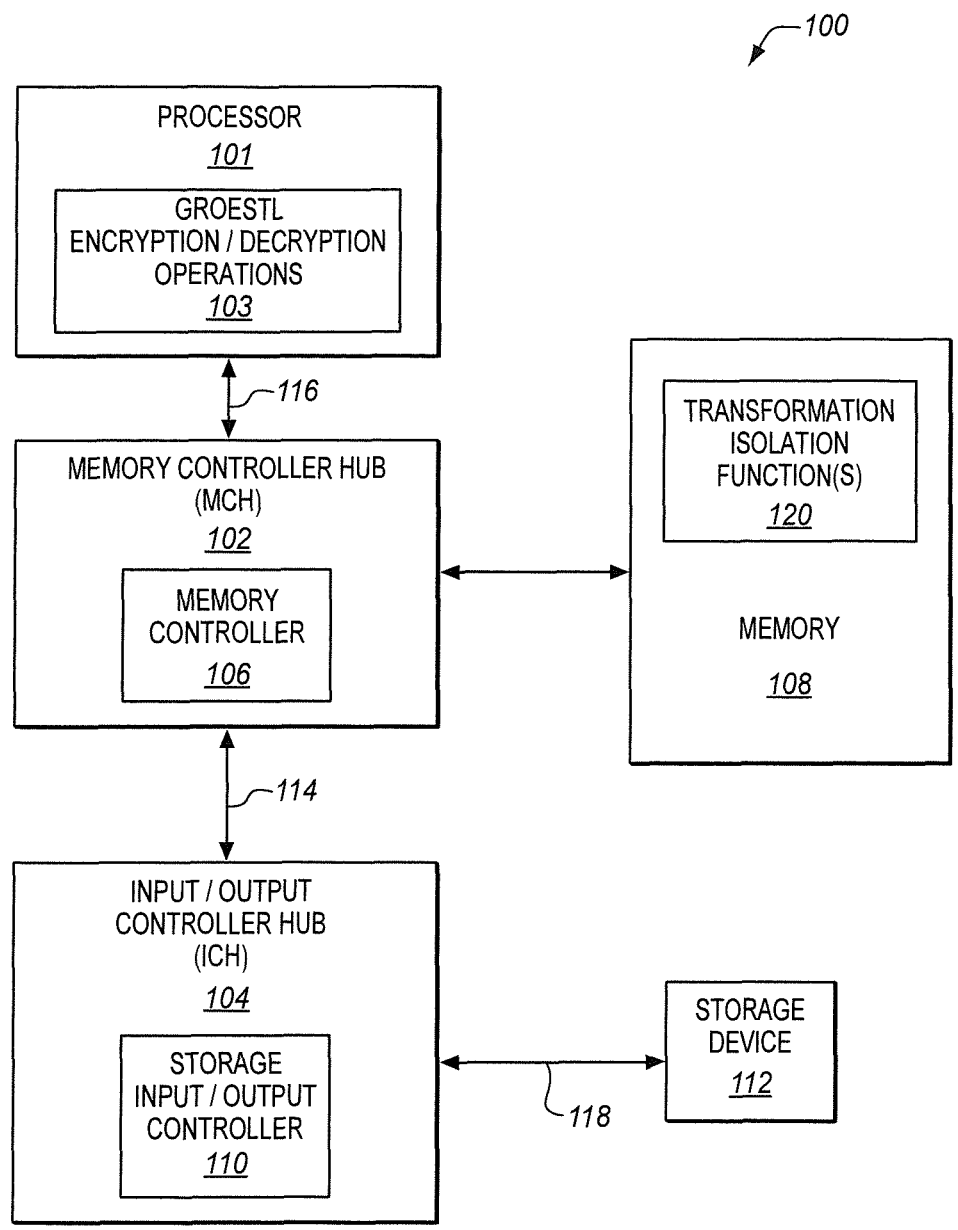
FIG. 1 is a block diagram illustrating one embodiment of a system.

The AES instruction set is an extension to the x86 instruction set architecture (ISA), which improves the speed of applications using the AES algorithm. According to one embodiment, the AES instruction set extension is implemented to perform the Groestl algorithm. FIG. 1 is a block diagram of one embodiment of a system 100 that includes an AES instruction set extension for performing Groestl encryption and decryption in a general purpose processor.

The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, Intel® Core® i3, i5, i7, 2 Duo and Quad, Xeon®, Itanium® processor, or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

In one embodiment, processor 101 includes a Groestl function 103 to perform Groestl encryption and decryption operations. The Groestl function 103 may be used to encrypt or decrypt information stored in memory 108 and/or stored in the storage device 112.

Figure 2:
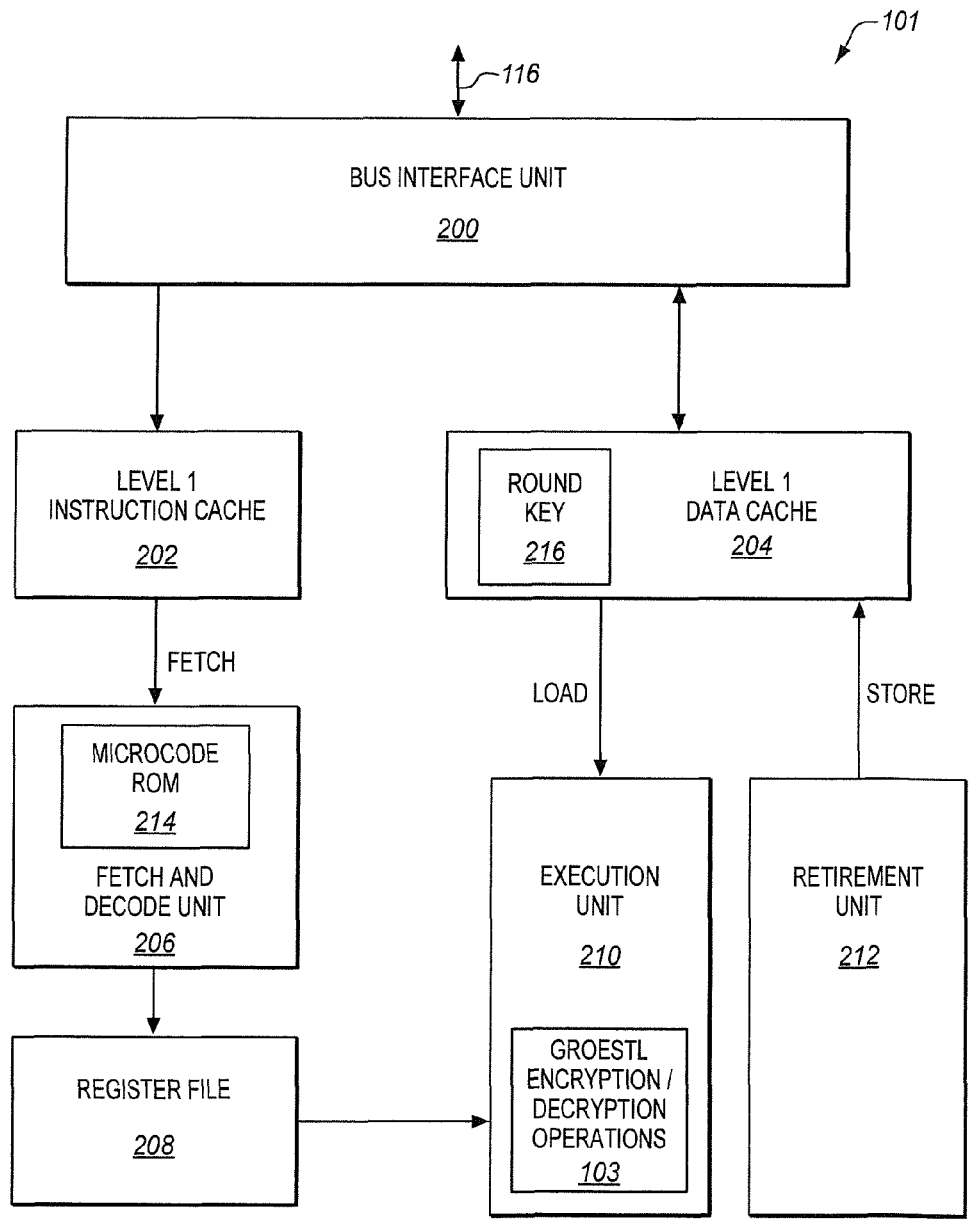
FIG. 2 is a block diagram illustrating one embodiment of a processor.

FIG. 2 is a block diagram illustrating one embodiment of processor 101. Processor 101 includes a fetch and decode unit 202 for decoding processor instructions received from Level 1 (L1) instruction cache 202. Data to be used for executing the instruction may be stored in to register file 208. In one embodiment, the register file 208 includes a plurality of registers that are used by an AES instruction to store data for use by the AES instruction.

Figure 3:
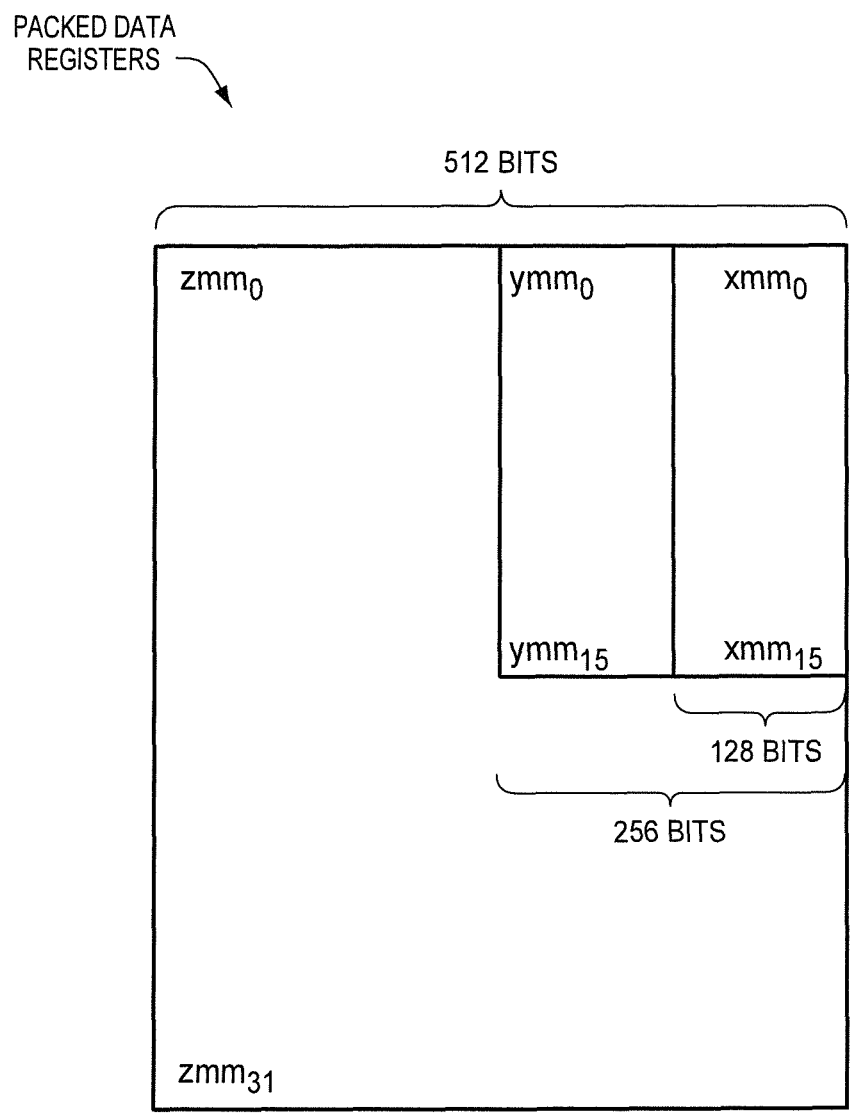
FIG. 3 is a block diagram illustrating one embodiment of packed data registers.

FIG. 3 is a block diagram of an example embodiment of a suitable set of packed data registers in register file 208. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required.

Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data.

The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Referring back to FIG. 2, the fetch and decode unit 202 fetches macroinstructions from L1 instruction cache 202, decodes the macroinstructions and breaks them into simple operations called micro operations (μops). The execution unit 210 schedules and executes the micro operations. In the embodiment shown, the Groestl function 103 in execution unit 210 includes micro operations for the AES instruction. The retirement unit 212 writes the results of the executed instructions to registers or memory.

Groestl function 103 performs a compression function f(h, m)=P(h XOR m) XOR Q(m) XOR h, where permutations of P and Q are designed using a number of rounds R, which includes a number of round transformations. In Groestl function 103, a total of four round transformations are defined for each permutation. The transformations operate on a state, represented as a matrix (e.g., matrix A) of 8-bit bytes. In one embodiment, the matrix has 8 rows and 8 columns. However other embodiments, may implement other variations (e.g., 8 rows and 16 columns).

In one embodiment, the sequence of transformations performed by Groestl function 103 includes an AddRoundConstant (AC) Transformation, a SubBytes Transformation, a ShiftBytes to Transformation and a MixBytes Transformation.

The AC transformation adds a round-dependent constant (e.g., A←A XOR c[i], where c[i] is the round constant used in round i) to the state matrix A. P and Q have different round constants.

The SubBytes transformation substitutes each byte in the state matrix by another value. The state is processed using a non-linear byte substitution table (S-Box). SubBytes is the 16 bytes to 16 bytes (byte-wise) transformation defined by applying an S-box transformation to each one of the 16 bytes.

The S-box transformation can be represented via a lookup table as follows: The input to the lookup table is a byte B[7:0] where x and y denote low and high nibbles x[3:0]=B[7:4], y[3:0]=B[3:0]. The output byte is encoded in the table as a two digit number in hexadecimal (H) notation. In one embodiment, the AES-NI instruction set provides the exact functionality to perform SubBytes for Groestl. In such an embodiment, the SubBytes transformation is computed using the AES-NI instruction AESENCLAST.

The ShiftBytes transformation cyclically shifts the bytes within a row to the left by a number of positions. In one embodiment, ShiftBytes implements the AES-NI instruction PSHUFB to quickly reorder bytes in the XMM registers.

The AC and ShiftBytes operations are not compute intensive when the P and Q matrix are organized by rows in XMM/YMM registers, while the SubBytes operation can be computed for up to 16 bytes at the same time using the AES-NI instruction AESENCLAST. Thus, most of the complexity and cycles in the AES instruction set are due to the MixBytes operation.

The MixBytes transformation transforms each column in the matrix independently. MixBytes implements a finite field $F_{256}$, which is defined via an irreducible polynomial $x^8$ XOR $x^4$ XOR $x^3$ XOR x XOR 1 over $F_2$. The bytes of the state matrix A can be seen as elements of $F_{256}$, (e.g., as polynomials of degree at most 7 with coefficient of {0,1}). The least significant bit of each byte determines the coefficient of $x^0$, etc.

MixBytes multiplies each column of matrix A by a constant 8×8 matrix B in $F_{256}$. Thus, the transformation on the whole matrix A can be written as the matrix multiplication A←B×A. In one embodiment, matrix B is circulant (e.g., each row is equal to the row above rotated right by one position and specified as:

$$B = \begin{bmatrix} 02 & 02 & 03 & 04 & 05 & 03 & 05 & 07 \\ 07 & 02 & 02 & 03 & 04 & 05 & 03 & 05 \\ 05 & 07 & 02 & 02 & 03 & 04 & 05 & 03 \\ 03 & 05 & 07 & 02 & 02 & 03 & 04 & 05 \\ 05 & 03 & 05 & 07 & 02 & 02 & 03 & 04 \\ 04 & 05 & 03 & 05 & 07 & 02 & 02 & 03 \\ 03 & 04 & 05 & 03 & 05 & 07 & 02 & 02 \\ 02 & 03 & 04 & 05 & 03 & 05 & 07 & 02 \end{bmatrix}.$$

Thus, B=circ(02; 02; 03; 04; 05; 03; 05; 07). Each row of the state matrix is multiplied and accumulated in $F_{256}$ with the 8 rows of the circulant B matrix to develop the MixBytes transformation one row at a time. This operation takes 8 instructions (64 multiply/accumulates in $F_{256}$). A total of 64×8 Galois Field (GF) 256 multiply/accumulates (with multipliers of 02, 03, 04, 05, 07) are implemented for Groestl-224/256.

Since the Groestl state is organized by rows the updated state matrix is formed a row at a time, such that:

Result Row1=ARow1*02+ARow2*02+ARow3*03+ARow4*04+ARow5*05+ARow6*03+ARow7*05+ARow8*07

Result Row2=ARow1*07+ARow2*02+ARow3*02+ARow4*03+ARow5*04+ARow6*05+ARow7*03+ARow8*05

Result Row3=ARow1*05+ARow2*07+ARow3*02+ARow4*02+ARow5*03+ARow6*04+ARow7*05+ARow8*03

Result Row4=ARow1*03+ARow2*05+ARow3*07+ARow4*02+ARow5*02+ARow6*03+ARow7*04+ARow8*05

Result Row5=ARow1*05+ARow2*03+ARow3*05+ARow4*07+ARow5*02+ARow6*02+ARow7*03+ARow8*04

Result Row6=ARow1*04+ARow2*05+ARow3*03+ARow4*05+ARow5*07+ARow6*02+ARow7*02+ARow8*03

Result Row7=ARow1*03+ARow2*04+ARow3*05+ARow4*03+ARow5*05+ARow6*07+ARow7*02+ARow8*02

Result Row8=ARow1*02+ARow2*03+ARow3*04+ARow4*05+ARow5*03+ARow6*05+ARow7*07+ARow8*02

Currently, GF multiplications by 02, 03, 04, 05 and 07 are accomplished with eight GF multiplications of each row by 2 and eight additional GF multiplications of the doubled row product by 2, again producing a product of 4 times each row. This results in sixteen GF multiplications. The 03 factor is formed as row XOR 2*row, the 05 factor is formed as row XOR 4*row, and the 07 factor as row XOR 2*row XOR 4*row. Further, the total number of XOR operations performed in conventional systems varies from 48 to 108.

In conventional systems using AES instructions, the GF multiplication by 2 is to accomplished by creating a register with bytes of Hexadecimal FF for multiplicand bytes with the most significant bit (msb) (e.g., =1) enabling the addition (XOR) of 1B for each byte product that exceeds 256. In such a system, the pcmpgtb instruction is used to create the FF byte mask register. Thus, the multiplication by 2 requires four or five SIMD instructions. Thus, the expected performance of MixBytes with present instructions is (16*4)+58=122 operations requiring 61 cycles retiring 2 SIMD instructions per cycle.

According to one embodiment, new instructions MUL_BYTE_GF2 and MIX_BYTE_XOR are implemented to accelerate the MixBytes transformation. In such an embodiment, the MUL_BYTE_GF2 instruction is executed twice to perform the GF multiplication by 2 operation on the state matrix. An example of this instruction is MUL_BYTE_GF2 ZMM2, ZMM1, where ZMM2=the initial 8×8 matrix organized in a 64 bit section of 8 byte rows; ZMM1=2 times each element of the matrix; where MUL_BYTE_GF2 ZMM2, ZMM1 forms 2× the original matrix in ZMM2, and MUL_BYTE_GF2 ZMM3, ZMM2 multiplies the 2× matrix in ZMM2 and ZMM3=four times each element of the ZMM1 matrix.

Figure 4A:
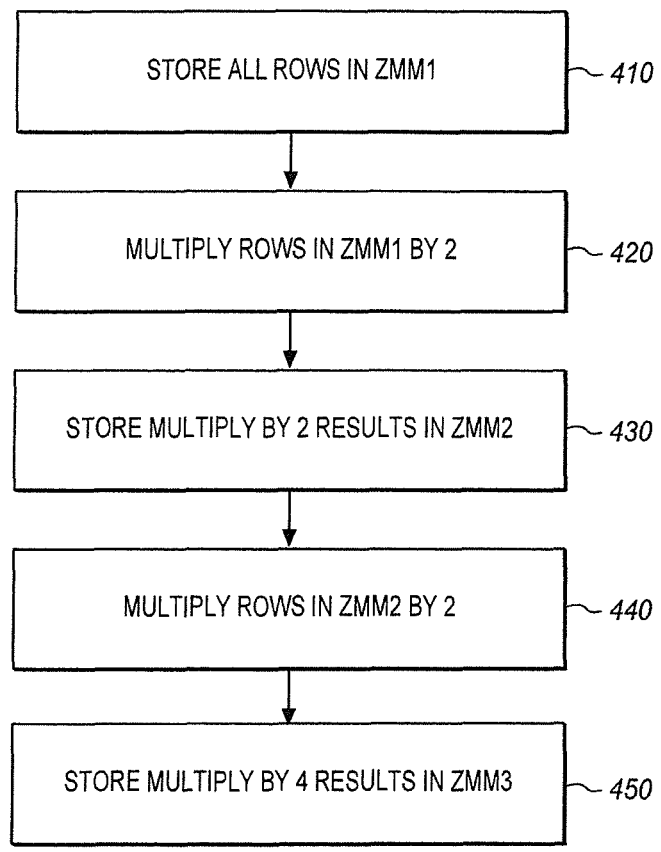
FIGS. 4A and 4B illustrate flow diagrams illustrating one embodiment of processes preformed by a MUL_BYTE_GF2 instruction and a MIX_BYTE_XOR instruction.

FIG. 4A is a flow diagram illustrating one embodiment of a process preformed by the MUL_BYTE_GF2 instruction. At processing block 410, all eight 64-bit rows are stored in ZMM1. At processing block 420, the stored rows in ZMM1 are multiplied by 2. For each byte where msb=1, the value is XORed with 1 $B_{hex}$ to complete the GF2 multiplication.

At processing block 430, GF2 results are stored in ZMM2. At processing block 440, the multiply by 2 results stored in ZMM2 are multiplied by 2 to create multiply by 4 results. At processing block 450, the multiply by 4 results are stored in ZMM3. Thus, the three ZMM registers include the 8×8 matrix, 2× each byte in GF2, and 4× each byte in GF2 that are used as the source operands for MIX_BYTE_XOR ZMM1, ZMM2, ZMM3, where ZMM1 is the destination register for the result of the MixByte operation.

Figure 4B:
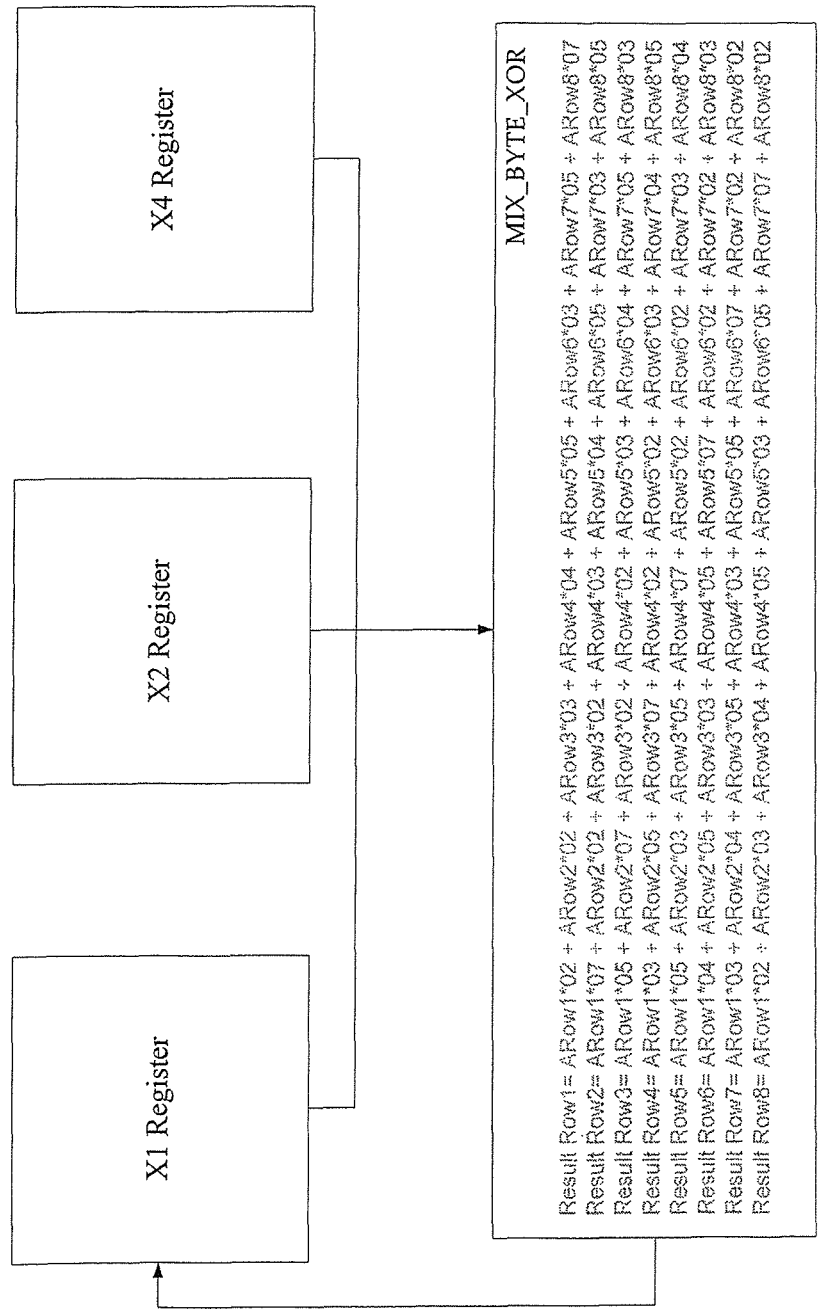

The data path for MIX_BYTE_XOR includes the routing to combine the 1, 2, and 4 factors of the state matrix with XOR functions. FIG. 4B illustrates one embodiment of a flow performed by MIX_BYTE_XOR. MIX_BYTE_XOR performs all XOR operations for each 64 (or 128) elements of the state matrix using the x1, x2, and x4 factors generated by MUL_BYTE_GF2 and stored in registers ZMM1, ZMM2 and ZMM3, respectively. As shown in FIG. 4B, the Result Rows are achieved by taking the multiplication factors from the result registers and performing the XOR operations.

In one embodiment, the x1, x2 and x4 factors are added to achieve the other factors. For example, the factor 3 in Result Row 1 is obtained by adding the x1 factor and the x2 factor from the respective registers. Similarly, the factor 7 is obtained by adding the x1, x2 and x4 factors. In one embodiment, the Result Rows are stored in ZMM1. However, in other embodiments, the Result Rows may be stored in either ZMM2 or ZMM3.

The MUL_BYTE_GF2 and MIX_BYTE_XOR instructions are implemented in a 3 cycle pipeline allowing P & Q matrices to be calculated in 10 cycles. The resulting performance improvement for the MUL_BYTE_GF2 and MIX_BYTE_XOR instructions is a reduction from 60 cycles to 10 cycles for the MixBytes calculation of the two P & Q 8×8 Groestl State Matrices.

In a further embodiment, Groestl-1024 uses the same instructions to perform the MixBytes operation on $P_{1024}$ and $Q_{1024}$ state matrices using 2 MUL_BYTE_GF2 instructions for the left 8×8 side of the matrix and 2 MUL_BYTE_GF2 instructions for the right 8×8 side of the matrix. The MIX_BYTE_XOR instruction is then used to determine each half of the 8×16 matrix.

Figure 5:
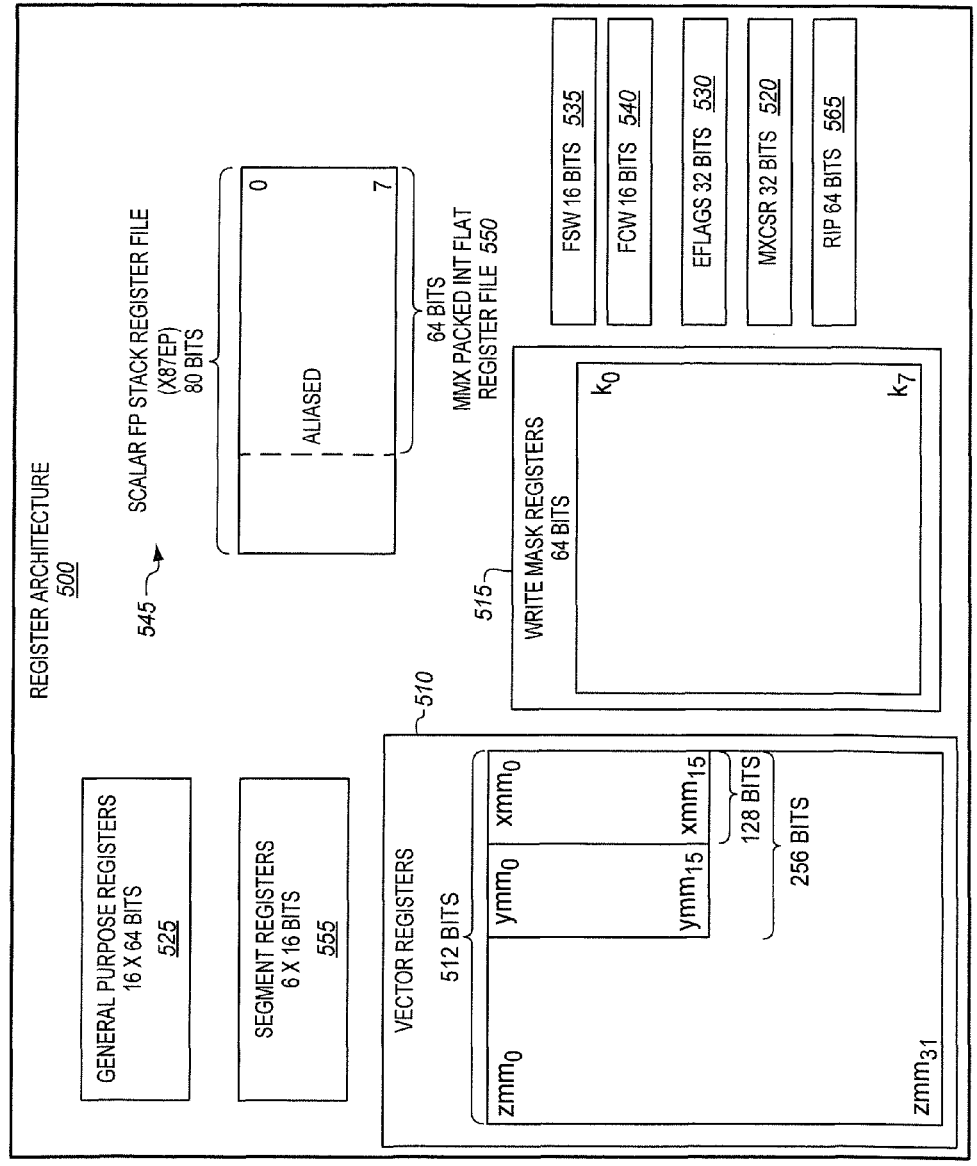
FIG. 5 is a block diagram of a register architecture according to one embodiment of the invention.

Exemplary Register Architecture—FIG. 5

FIG. 5 is a block diagram illustrating a register architecture 500 according to one embodiment of the invention. The register files and registers of the register architecture are listed below:

Vector register file 510—in the embodiment illustrated, there are 32 vector registers that are 512 bits wide; these registers are referenced as zmm0 through zmm31. The lower order 856 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 515—in the embodiment illustrated, there are 8 write mask registers (k0 through k7), each 64 bits in size. As previously described, in one embodiment of the invention the vector mask register k0 cannot be used as a write mask; when the encoding that would normally indicate k0 is used for a write mask, it selects a hardwired write mask of 0xFFFF, effectively disabling write masking for that instruction.

Multimedia Extensions Control Status Register (MXCSR) 1020—in the embodiment illustrated, this 32-bit register provides status and control bits used in floating-point operations.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Extended flags (EFLAGS) register 530—in the embodiment illustrated, this 32 bit register is used to record the results of many instructions.

Floating Point Control Word (FCW) register 535 and Floating Point Status Word (FSW) register 540—in the embodiment illustrated, these registers are used by x87 instruction set extensions to set rounding modes, exception masks and flags in the case of the FCW, and to keep track of exceptions in the case of the FSW.

Scalar floating point stack register file (x87 stack) 545 on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Segment registers 555—in the illustrated embodiment, there are six 16 bit registers use to store data used for segmented address generation.

RIP register 565—in the illustrated embodiment, this 64 bit register that stores the instruction pointer.

Alternative embodiments of the invention may use wider or narrower registers. Additionally, alternative embodiments of the invention may use more, less, or different register files and registers.

Figure 6:
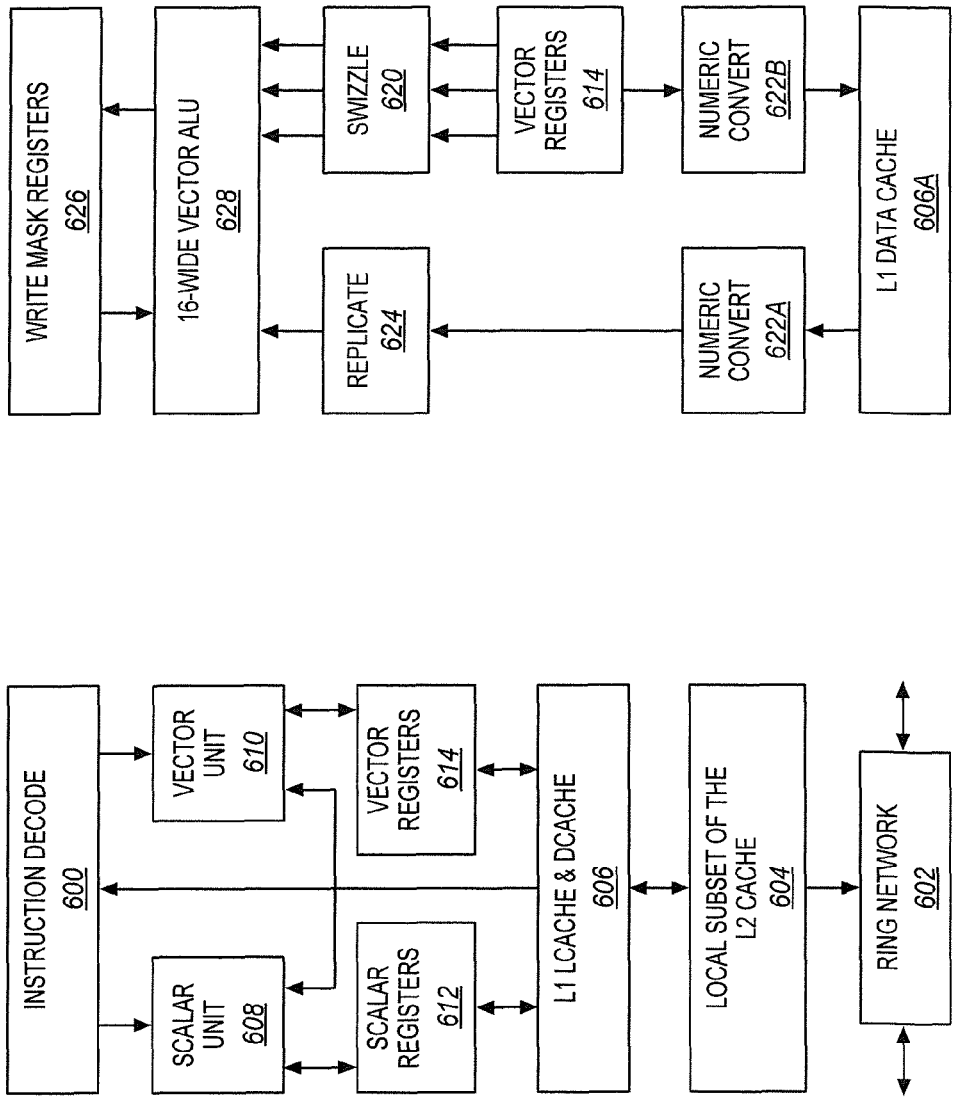
FIG. 6A is a block diagram of a single CPU core, along with its connection to the on-die interconnect network and with its local subset of the level 2 (L2) cache, according to embodiments of the invention.
FIG. 6B is an exploded view of part of the CPU core according to embodiments of the invention.

Exemplary In-Order Processor Architecture—FIGS. 6A-6B

FIGS. 6A-B illustrate a block diagram of an exemplary in-order processor architecture. These exemplary embodiments are designed around multiple instantiations of an in-order CPU core that is augmented with a wide vector processor (VPU). Cores communicate through a high-bandwidth interconnect network with some fixed function logic, memory I/O interfaces, and other necessary I/O logic, depending on the application. For example, an implementation of this embodiment as a stand-alone GPU would typically include a PCIe bus.

FIG. 6A is a block diagram of a single CPU core, along with its connection to the on-die interconnect network 602 and with its local subset of the level 2 (L2) cache 1104, according to embodiments of the invention. An instruction decoder 600 supports the x86 instruction set with an extension. While in one embodiment of the invention (to simplify the design) a scalar unit 608 and a vector unit 610 use separate register sets (respectively, scalar registers 612 and vector registers 614) and data transferred between them is written to memory and then read back in from a level 1 (L1) cache 606, alternative embodiments of the invention may use a different approach (e.g., use a single register set or include a communication path that allow data to be transferred between the two register files without being written and read back).

The L1 cache 606 allows low-latency accesses to cache memory into the scalar and vector units. Together with load-op instructions in the vector friendly instruction format, this means that the L1 cache 606 can be treated somewhat like an extended register file. This significantly improves the performance of many algorithms.

The local subset of the L2 cache 604 is part of a global L2 cache that is divided into separate local subsets, one per CPU core. Each CPU has a direct access path to its own local subset of the L2 cache 604. Data read by a CPU core is stored in its L2 cache subset 604 and can be accessed quickly, in parallel with other CPUs accessing their own local L2 cache subsets. Data written by a CPU core is stored in its own L2 cache subset 604 and is flushed from other subsets, if necessary. The ring network ensures coherency for shared data.

FIG. 6B is an exploded view of part of the CPU core in FIG. 6A according to embodiments of the invention. FIG. 6B includes an L1 data cache 606A part of the L1 cache 604, as well as more detail regarding the vector unit 610 and the vector registers 1114. Specifically, the vector unit 610 is a 16-wide vector processing unit (VPU) (see the 16-wide ALU 1128), which executes integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating the resulting vector writes.

Register data can be swizzled in a variety of ways, e.g. to support matrix multiplication. Data from memory can be replicated across the VPU lanes. This is a common operation in both graphics and non-graphics parallel data processing, which significantly increases the cache efficiency.

The ring network is bi-directional to allow agents such as CPU cores, L2 caches and other logic blocks to communicate with each other within the chip. Each ring data-path is 1012-bits wide per direction.

Figure 7:
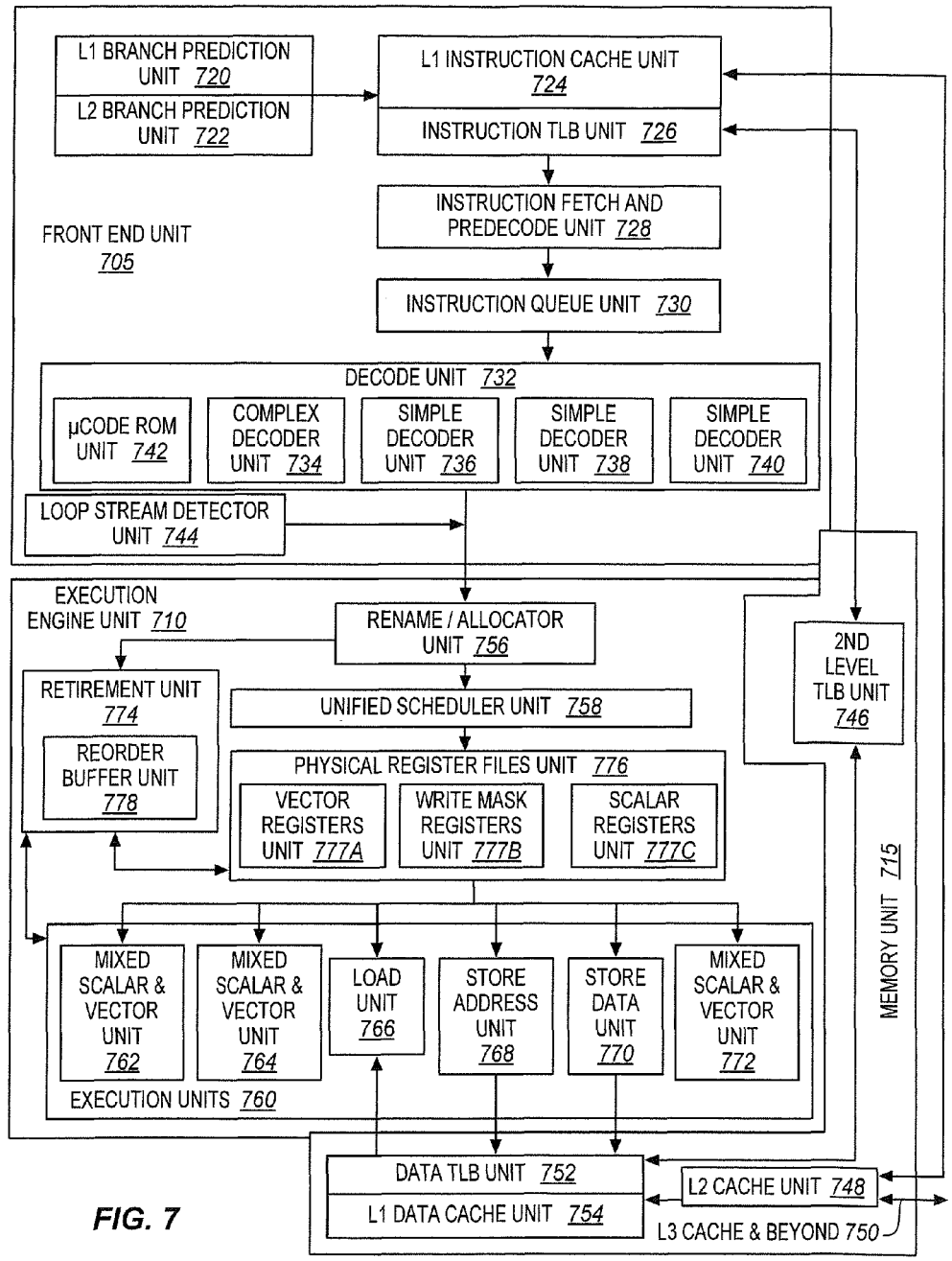
FIG. 7 is a block diagram illustrating an exemplary out-of-order architecture according to embodiments of the invention.

Exemplary Out-of-order Architecture—FIG. 7

FIG. 7 is a block diagram illustrating an exemplary out-of-order architecture according to embodiments of the invention. Specifically, FIG. 7 illustrates a well-known exemplary out-of-order architecture that has been modified to incorporate the vector friendly instruction format and execution thereof. In FIG. 7 arrows denote a coupling between two or more units and the direction of the arrow indicates a direction of data flow between those units. FIG. 7 includes a front end unit 705 coupled to an execution engine unit 710 and a memory unit 715; the execution engine unit 710 is further coupled to the memory unit 715.

The front end unit 705 includes a level 1 (L1) branch prediction unit 720 coupled to a to level 2 (L2) branch prediction unit 722. The L1 and L2 brand prediction units 720 and 722 are coupled to an L1 instruction cache unit 724. The L1 instruction cache unit 724 is coupled to an instruction translation lookaside buffer (TLB) 726 which is further coupled to an instruction fetch and predecode unit 728. The instruction fetch and predecode unit 728 is coupled to an instruction queue unit 730 which is further coupled a decode unit 732. The decode unit 732 comprises a complex decoder unit 734 and three simple decoder units 736, 738, and 740. The decode unit 732 includes a micro-code ROM unit 742. The decode unit7 may operate as previously described above in the decode stage section. The L1 instruction cache unit 724 is further coupled to an L2 cache unit 748 in the memory unit 715. The instruction TLB unit 726 is further coupled to a second level TLB unit 746 in the memory unit 715. The decode unit 732, the micro-code ROM unit 742, and a loop stream detector unit 744 are each coupled to a rename/allocator unit 756 in the execution engine unit 710.

The execution engine unit 710 includes the rename/allocator unit 756 that is coupled to a retirement unit 774 and a unified scheduler unit 758. The retirement unit 774 is further coupled to execution units 760 and includes a reorder buffer unit 778. The unified scheduler unit 758 is further coupled to a physical register files unit 776 which is coupled to the execution units 760. The physical register files unit 776 comprises a vector registers unit 777A, a write mask registers unit 777B, and a scalar registers unit 777C; these register units may provide the vector registers 510, the vector mask registers 515, and the general purpose registers 525; and the physical register files unit 776 may include additional register files not shown (e.g., the scalar floating point stack register file 545 aliased on the MMX packed integer flat register file 550). The execution units 1260 include three mixed scalar and vector units 762, 764, and 772; a load unit 766; a store address unit 768; a store data unit 770. The load unit 766, the store address unit 768, and the store data unit 770 are each coupled further to a data TLB unit 752 in the memory unit 715.

The memory unit 715 includes the second level TLB unit 746 which is coupled to the data TLB unit 752. The data TLB unit 752 is coupled to an L1 data cache unit 754. The L1 data cache unit 754 is further coupled to an L2 cache unit 748. In some embodiments, the L2 cache unit 748 is further coupled to L3 and higher cache units 750 inside and/or outside of the memory unit 715.

By way of example, the exemplary out-of-order architecture may implement the process pipeline 8200 as follows: 1) the instruction fetch and predecode unit 728 perform the fetch and length decoding stages; 2) the decode unit 732 performs the decode stage; 3) the rename/allocator unit 756 performs the allocation stage and renaming stage; 4) the unified scheduler 758 performs the schedule stage; 5) the physical register files unit 776, the reorder buffer unit 778, and the memory unit 715 perform the register read/memory read stage; the execution units 760 perform the execute/data transform stage; 6) the memory unit 715 and the reorder buffer unit 778 perform the write back/memory write stage 1960; 7) the retirement unit 774 performs the ROB read stage; 8) various units may be involved in the exception handling stage; and 9) the retirement unit 1274 and the physical register files unit 776 perform the commit stage.

Figure 8:
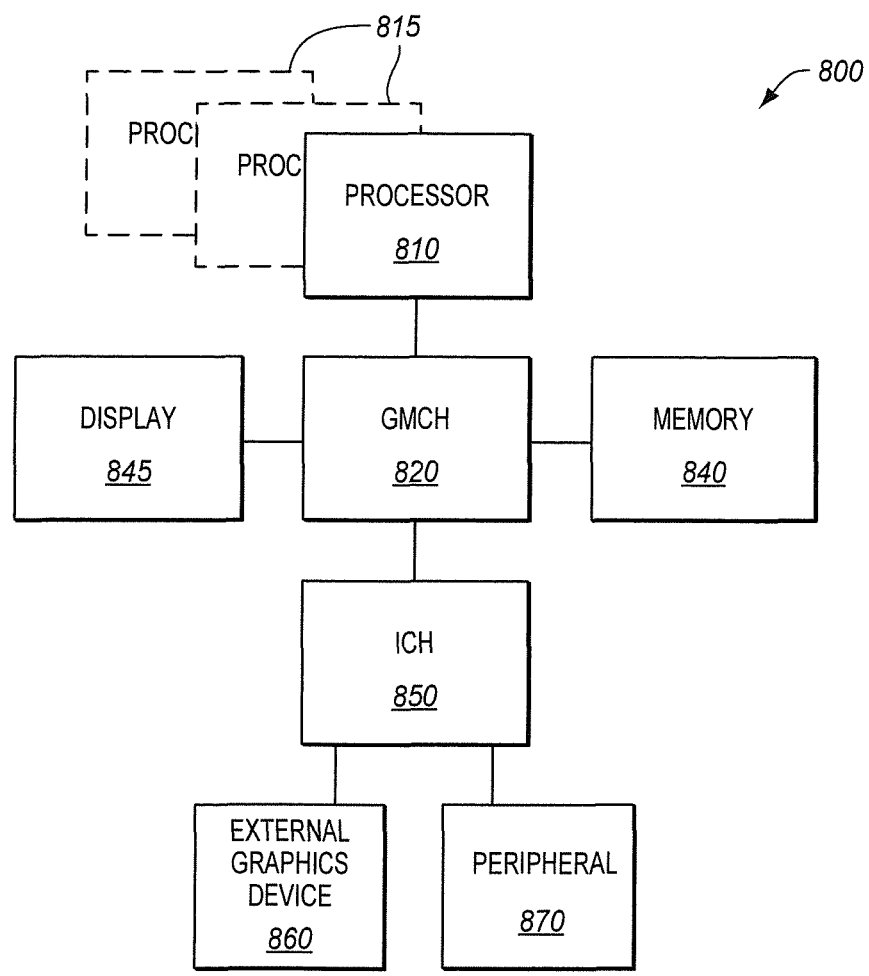
FIG. 8 is a block diagram of a system in accordance with one embodiment of the invention.
Figure 9:
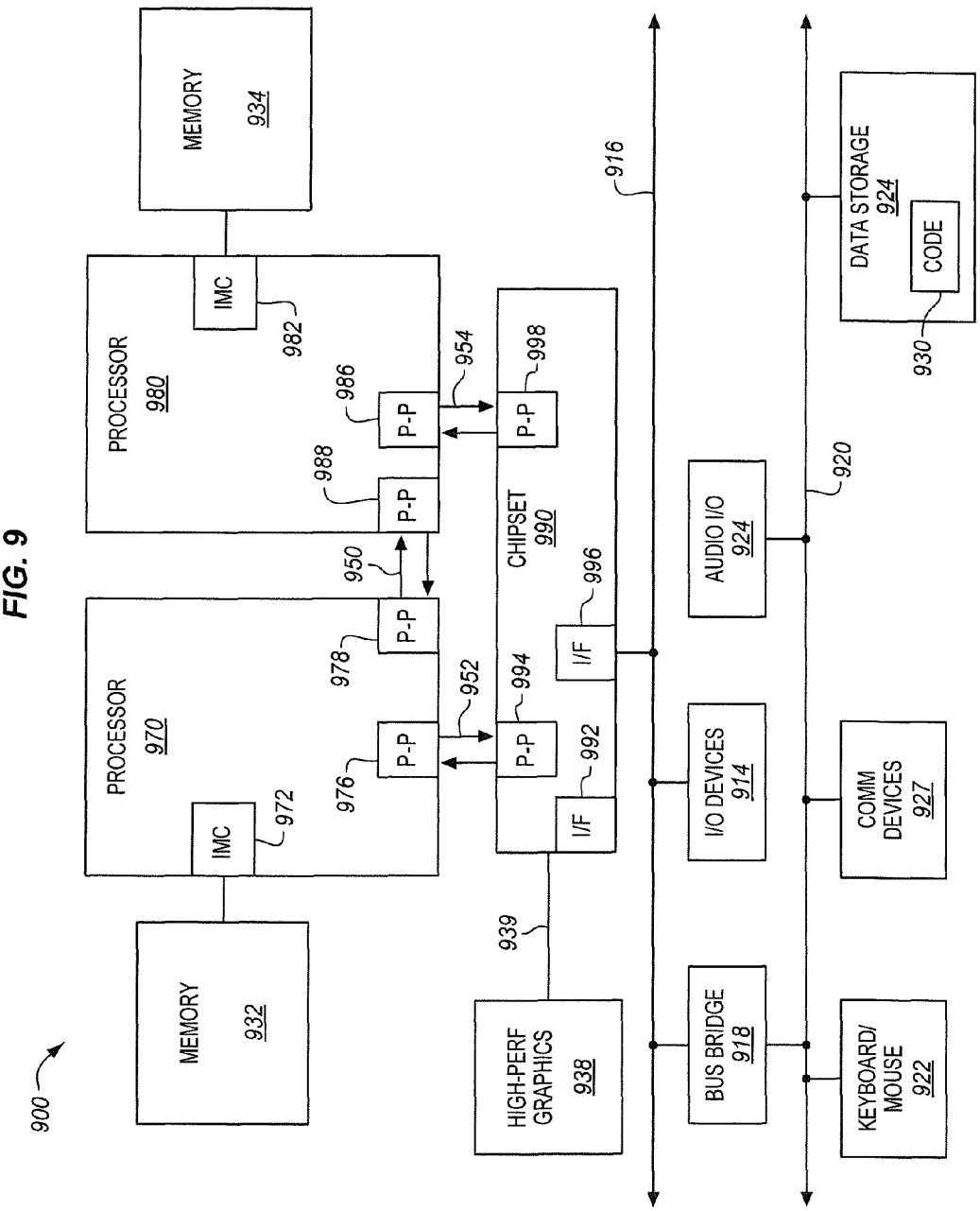
FIG. 9 is a block diagram of a second system in accordance with an embodiment of the invention.
Figure 10:
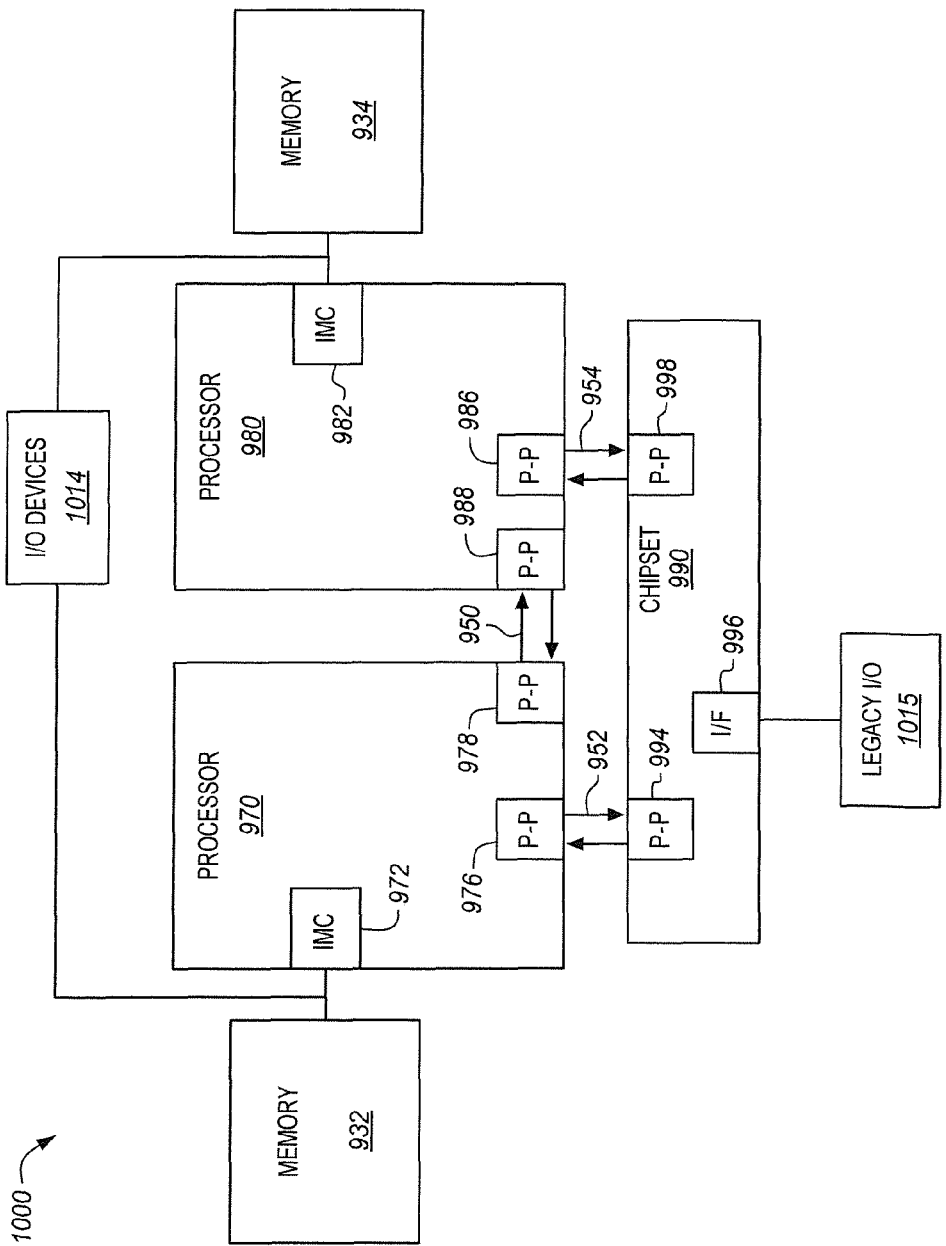
FIG. 10 is a block diagram of a third system in accordance with an embodiment of the invention.

Exemplary Computer Systems and Processors—FIGS. 8-10

FIGS. 8-10 are exemplary systems suitable for including the processor 101. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a system 800 in accordance with one embodiment of the invention. The system 800 may include one or more processors 810, 815, which are coupled to graphics memory controller hub (GMCH) 820. The optional nature of additional processors 815 is denoted in FIG. 8 with broken lines.

Each processor 810, 815 may be some version of processor 1700. However, it should be noted that it is unlikely that integrated graphics logic and integrated memory control units would exist in the processors 810 and 815.

FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the physical resources 810, 815 in terms of a spectrum of metrics of merit including architectural, micro-architectural, thermal, power consumption characteristics, and the like. These differences may effectively manifest themselves as asymmetry and heterogeneity amongst the processing elements 810, 815. For at least one embodiment, the various processing elements 810, 815 may reside in the same die package.

Referring now to FIG. 9, shown is a block diagram of a second system 900 in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be some version of the processor 101.

Alternatively, one or more of processors 970, 980 may be an element other than a processor, such as an accelerator or a field programmable gate array.

While shown with only two processors 970, 980, it is to be understood that the scope of the present invention is not so limited. In other embodiments, one or more additional processing elements may be present in a given processor.

Processor 970 may further include an integrated memory controller hub (IMC) 972 and point-to-point (P-P) interfaces 976 and 978. Similarly, second processor 980 may include a IMC 982 and P-P interfaces 986 and 988. Processors 970, 980 may exchange data via a point-to-point (PtP) interface 950 using PtP interface circuits 978, 988. As shown in FIG. 9, IMC's 972 and 982 couple the processors to respective memories, namely a memory 942 and a memory 944, which may be portions of main memory locally attached to the respective processors.

Processors 970, 980 may each exchange data with a chipset 990 via individual P-P interfaces 952, 954 using point to point interface circuits 976, 994, 986, 998. Chipset 990 may also exchange data with a high-performance graphics circuit 938 via a high-performance graphics interface 939.

A shared cache (not shown) may be included in either processor outside of both processors, yet connected with the processors via P-P interconnect, such that either or both processors' local cache information may be stored in the shared cache if a processor is placed into a low power mode. Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 99 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Referring now to FIG. 10, shown is a block diagram of a third system 1500 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing elements 970, 980 may include integrated memory and I/O control logic ("CL") 972 and 982, respectively. For at least one embodiment, the CL 972, 982 may include memory controller hub logic (IMC). In addition. CL 972, 982 may also include I/O control logic. FIG. 10 illustrates that not only are the memories 942, 944 coupled to the CL 972, 982, but also that I/O devices 914 are also coupled to the control logic 972, 982. Legacy I/O devices 915 are coupled to the chipset 990.

Figure 11:
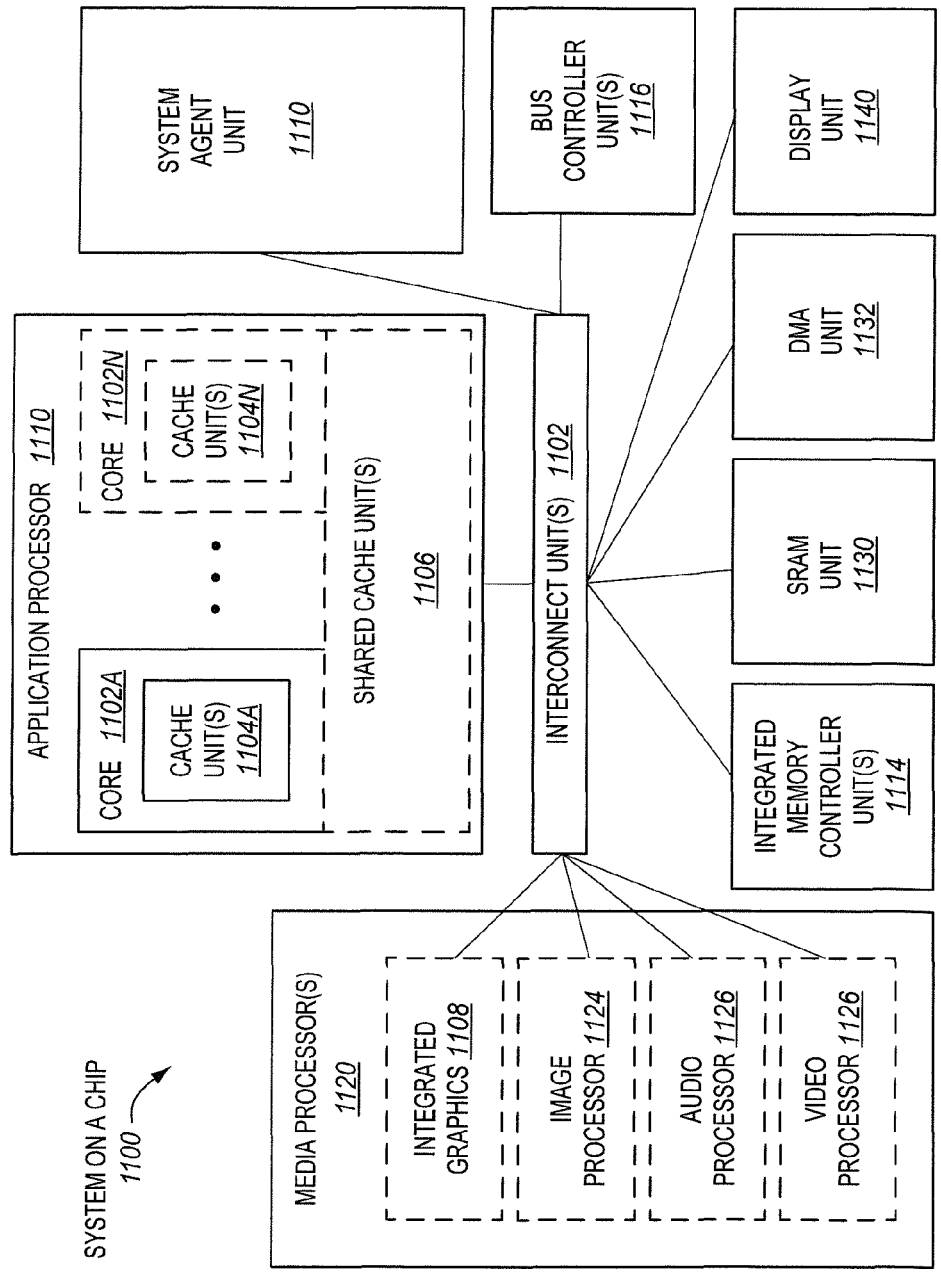
FIG. 11 is a block diagram of a system on chip (SoC) in accordance with an embodiment of the invention.
Figure 12:
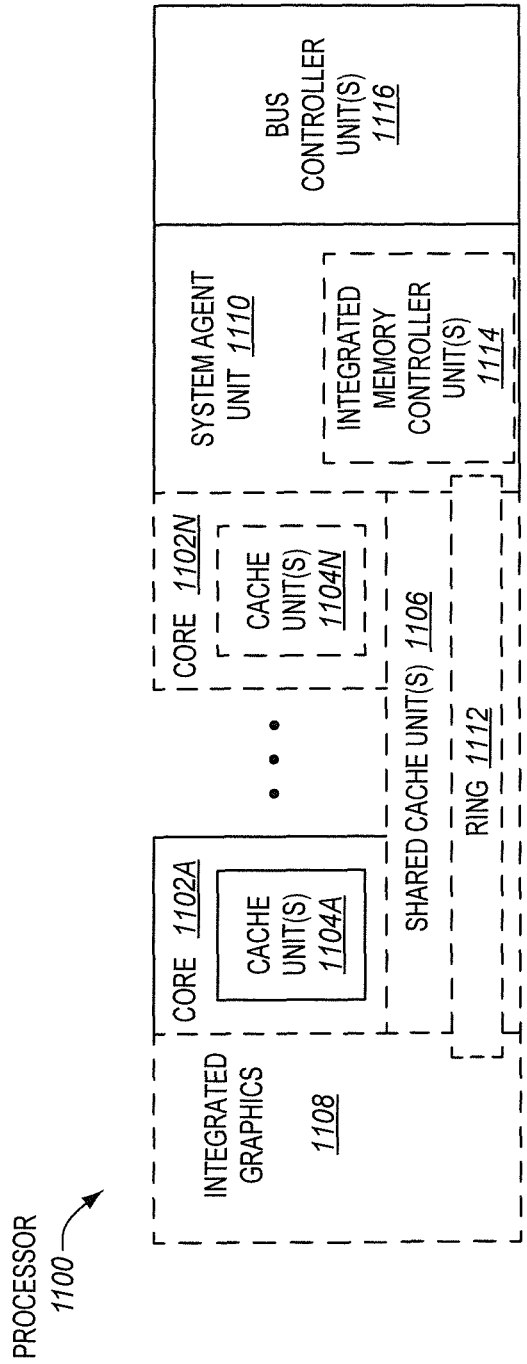
FIG. 12 is a block diagram of a single core processor and a multi-core processor with integrated memory controller and graphics according to embodiments of the invention.

Referring now to FIG. 11, shown is a block diagram of a SoC 1100 in accordance with an embodiment of the present invention. Similar elements in FIG. 12 bear like reference numerals. Also, dashed lined boxes are optional features on more advanced SoCs. In FIG. 11, an interconnect unit(s) 1102 is coupled to: an application processor 1110 which includes a set of one or more cores 1102A-N and shared cache unit(s) 1106; a system agent unit 1110; a bus controller unit(s) 1111; an integrated memory controller unit(s) 1114; a set or one or more media processors 1120 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions the vector friendly instruction format or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
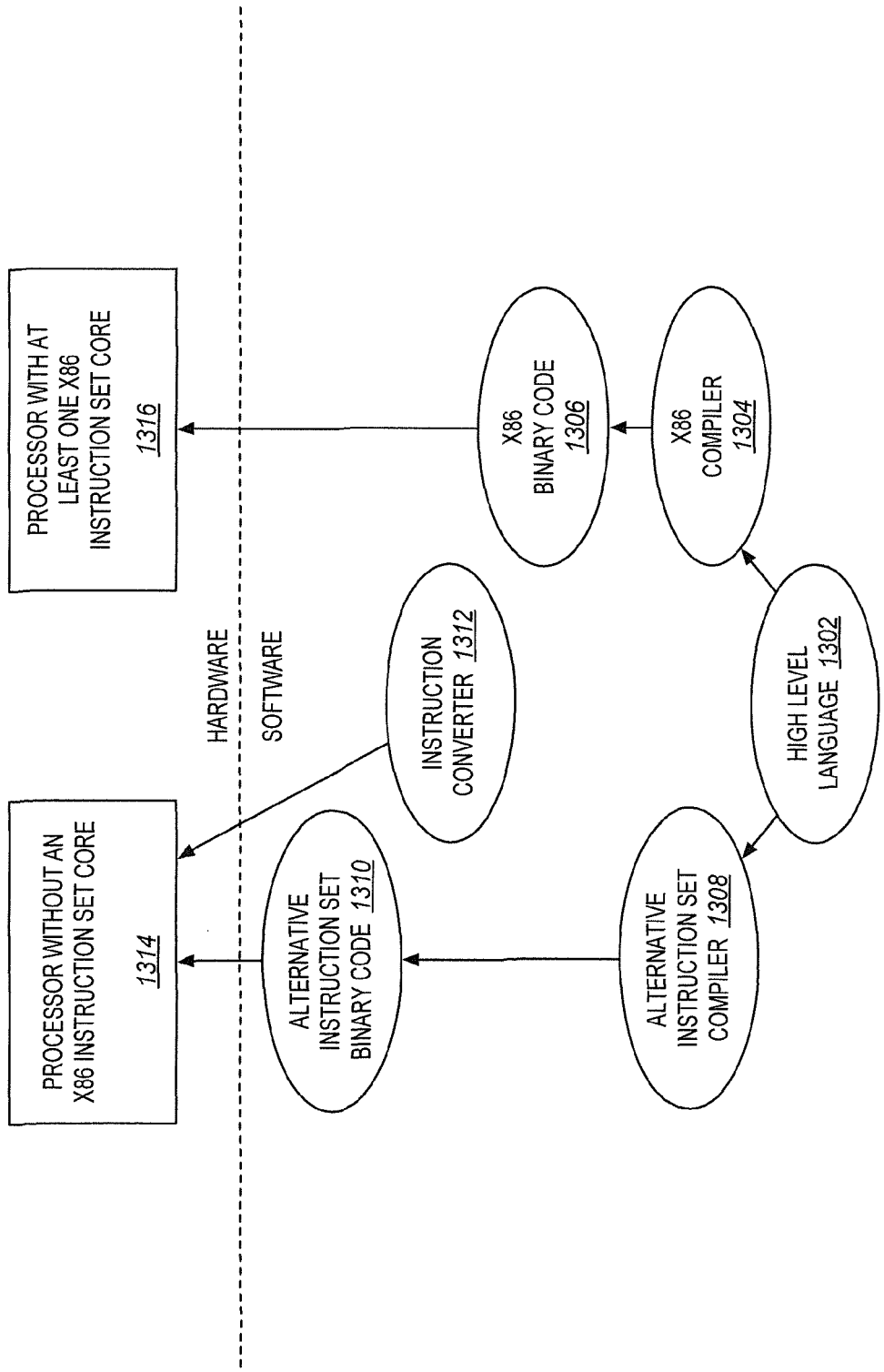
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof.

FIG. 13 shows a program in a high level language 1302 may be compiled using an x86 compiler 1304 to generate x86 binary code 1306 that may be natively executed by a processor with at least one x86 instruction set core 1316 (it is assume that some of the instructions that were compiled are in the vector friendly instruction format). The processor with at least one x86 instruction set core 1816 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1306 (e.g., object code) that can, with or without additional linkage processing, be executed on the processor with at least one x86 instruction set core 1316. Similarly, FIG. 90 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Certain operations of the instruction(s) may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 13-16 and embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a to different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of performing a process in a computer processor, comprising:
   executing, by the computer processor, an instruction to perform one or more Galois Field (GF) multiply by 2 operations on a state matrix, by storing rows of the state matrix in a first register, performing a GF multiply by 2 operation on each row stored in the first register, and storing the results of the GF multiply by 2 operation in a second register; and
   executing, by the computer processor, an instruction to combine results of the one or more GF multiply by 2 operations with exclusive or (XOR) functions to generate a result matrix.

2. The method of claim 1 further comprising executing, by the computer processor, the instruction to perform GF multiply by 2 operations a second time on the state matrix prior to executing the instruction to combine results.

3. The method of claim 1 wherein performing the one or more GF multiply by 2 operations further comprises performing an XOR operation for each most significant bit having a value of 1.

4. The method of claim 1 wherein performing the one or more GF multiply by 2 operations further comprises:
   performing a second GF multiply by 2 operation on each row stored in the second register; and storing the results of the second GF multiply by 2 operation in a third register.

5. The method of claim 4 wherein executing, by the computer processor, the instruction to combine results of the one or more GF multiply by 2 operations comprises using data stored in the first, second and third registers as source operands to combine factors of the state matrix.

6. The method of claim 5 wherein the result matrix is stored in the first register.

7. The method of claim 4 wherein the state matrix is an 8×8 matrix of 8 bit entries.

8. The method of claim 4 wherein the first, second and third registers are 512-bit registers.

9. The method of claim 2 wherein the state matrix is an 8×16 matrix of 8 bit entries.

10. The method of claim 7 further comprising:
executing, by the computer processor, the instruction to perform GF multiply by 2 operations on a second half of the state matrix; and
executing, by the computer processor, the instruction to perform GF multiply by 2 operations a second time on the second half of the state matrix.

11. An apparatus comprising:
a plurality of data registers; and
a hardware execution unit coupled with the plurality of the data registers, to execute:
an instruction to perform one or more Galois Field (GF) multiply by 2 operations on a state matrix by storing rows of the state matrix in first register, performing a GF multiply by 2 operation on each row stored in the first register, and storing the results of the GF multiply by 2 operation in a second register, and
an instruction to combine results of the one or more GF multiply by 2 operations with exclusive or (XOR) functions to generate a result matrix.

12. The apparatus of claim 11 wherein the hardware execution unit to execute the instruction to perform the GF multiply by 2 operations on the state matrix a second time prior to executing the instruction to combine results.

13. The apparatus of claim 11 wherein performing the one or more GF multiply by 2 operations further comprises performing an XOR operation for each most significant bit having a value of 1.

14. The apparatus of claim 11 wherein performing the one or more GF multiply by 2 operations further comprises performing a second GF multiply by 2 operation on each row stored in the second register and storing the results of the second GF multiply by 2 operation in a third register.

15. The apparatus of claim 14 wherein to execute the instruction to combine results of the one or more GF multiply by 2 operations comprises using data stored in the first, second and third registers as source operands to combine factors of the state matrix.

16. The apparatus of claim 15 wherein the result matrix is stored in the first register.

17. The apparatus of claim 14 wherein the state matrix is an 8×8 matrix of 8 bit entries.

18. The apparatus of claim 12 wherein the state matrix is an 8×16 matrix of 8 bit entries.

19. The apparatus of claim 18 wherein the hardware execution unit further executes the instruction to perform GF multiply by 2 operations on a second half of the state matrix and executes the instruction to perform GF multiply by 2 operations a second time on the second half of the state matrix.

20. A system comprising:
an interconnect;
a hardware processor coupled with the interconnect, to execute an instruction to perform one or more Galois Field (GF) multiply by 2 operations on a state matrix and thereby to store rows of the state matrix in a first register, perform GF multiply by 2 operation on each row stored in the first register, and store the results of the GF multiply by 2 operation in a second register and an instruction to combine results of the one or more GF multiply by 2 operations with exclusive or (XOR) functions to generate a result matrix; and
a dynamic random access memory (DRAM) coupled with the interconnect.

21. The system of claim 20 wherein the hardware processor to execute the instruction to perform the GF multiply by 2 operations on the state matrix a second time prior to executing the instruction to combine results.

22. The system of claim 20 wherein to perform the one or more GF multiply by 2 operations comprises to store rows of the state matrix in a first register, performing a GF multiply by 2 operation on each row stored in the first register, store the results of the GF multiply by 2 operation in a second register, perform a second GF multiply by 2 operation on each row stored in the second register and storing the results of the second GF multiply by 2 operation in a third register.

23. The system of claim 22 wherein to execute the instruction to combine results of the one or more GF multiply by 2 operations comprises using data stored in the first, second and third registers as source operands to combine factors of the state matrix.

24. The system of claim 20 wherein the hardware processor to further execute the instruction to perform GF multiply by 2 operations on a second half of the state matrix and execute the instruction to perform GF multiply by 2 operations a second time on the second half of the state matrix.

25. An article of manufacture comprising:
a non-transitory machine-readable storage medium including one or more solid data storage materials, the machine-readable storage medium storing instructions, which when executed causes a processor to:
perform one or more Galois Field (GF) multiply by 2 operations on a state matrix, by storing rows of the state matrix in a first register, performing a GF multiply by 2 operation on each row stored in the first register, and storing the results of the GF multiply by 2 operation in a second register; and
combine results of the one or more GF multiply by 2 operations with exclusive or (XOR) functions to generate a result matrix.

26. The article of manufacture of claim 25 wherein the machine-readable storage medium stores instructions, which when executed causes the processor to further perform the GF multiply by 2 operations on the state matrix a second time prior to executing the instruction to combine results.

27. The article of manufacture of claim 26 wherein performing the one or more GF multiply by 2 operations further comprises performing a second GF multiply by 2 operation on each row stored in the second register and storing the results of the second GF multiply by 2 operation in a third register.

28. The article of manufacture of claim 27 wherein executing the instruction to combine results of the one or more GF multiply by 2 operations comprises using data stored in the first, second and third registers as source operands to combine factors of the state matrix.

* * * * *